US006789680B2

(12) United States Patent
Ward et al.

(10) Patent No.: US 6,789,680 B2
(45) Date of Patent: Sep. 14, 2004

(54) SCREEN ASSEMBLY FOR VIBRATORY SEPARATOR

(75) Inventors: Kerry Ward, Cypress, TX (US); David Person, Missouri City, TX (US); Thomas C. Adams, Hockley, TX (US); Douglas Graham, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 223 days.

(21) Appl. No.: 10/171,103

(22) Filed: Jun. 13, 2002

(65) Prior Publication Data

US 2004/0016677 A1 Jan. 29, 2004

(51) Int. Cl.[7] .............................................. B07B 1/49
(52) U.S. Cl. ...................... 209/403; 208/405; 208/408
(58) Field of Search ............................... 209/403, 405, 209/408, 412

(56) References Cited

U.S. PATENT DOCUMENTS

| 3,660,188 | A |   | 5/1972 | VanLeer ...................... 156/94 |
|---|---|---|---|---|
| 4,374,408 | A | * | 2/1983 | Bowles et al. .............. 717/137 |
| 5,735,409 | A | * | 4/1998 | Malmberg ................... 209/399 |
| 5,950,841 | A |   | 9/1999 | Knox et al. ................. 209/315 |
| 6,431,368 | B1 |  | 8/2002 | Carr ........................... 209/403 |
| 6,685,028 | B1 |  | 2/2004 | Olsen ......................... 209/405 |
| 6,692,599 | B2 |  | 2/2004 | Cook et al. ................... 156/94 |

FOREIGN PATENT DOCUMENTS

| GB | 1 578 948 | 11/1980 | ............. B07B/1/50 |
|---|---|---|---|
| GB | 2 203 061 A | 10/1988 | ........... B01D/25/02 |
| WO | WO 0176719 A | 10/2001 | ........... B01D/33/00 |

OTHER PUBLICATIONS

Int'l Search Report, PCT/EP03/50154, Oct. 23, 2003.

* cited by examiner

*Primary Examiner*—Donald P. Walsh
*Assistant Examiner*—Kaitlin Joerger
(74) *Attorney, Agent, or Firm*—Guy McClung

(57) ABSTRACT

A screen assembly for a vibratory separator which, in at least certain aspects, has supporting apparatus with a plurality of openings therethrough, screening material on the supporting apparatus over the plurality of openings, the supporting apparatus recovered from a predecessor screen assembly by applying heat to the predecessor screen assembly, the predecessor screen assembly having the supporting apparatus and predecessor screening material secured to the supporting apparatus by securing material, the heat applied to the predecessor screen assembly sufficient to degrade, powderize, turn to ash and/or cook off the securing material so that recovery of the supporting apparatus is facilitated; and methods for effecting such recovery.

20 Claims, 2 Drawing Sheets

SCREEN ASSEMBLY FOR VIBRATORY SEPARATOR

BACKGROUND OF THE INVENTION

1. Field of the Invention

The present invention is directed to: screens for vibratory separators and shale shakers; methods for making such screens; and methods for reclaiming screen assembly parts for re-use and/or salvage.

2. Description of Related Art

A wide variety of industries use vibratory separators to separate materials such as liquids from solids or solids from solids. Typically such separators have a basket or other screen holding or mounting apparatus mounted in or over a receiving receptacle or tank and vibrating apparatus for vibrating the basket. One or more screens or "screen assemblies" are mounted in the basket. Material to be treated is introduced to the screen(s) and separated material on top of the screen(s) flows off an end of an end screen.

With certain prior art screen assemblies used in vibratory separators and shale shakers, screening material is mounted on a frame or support and the screening material extends over substantially all of the frame's or support's area. In may prior art screens and screen assemblies, one, two, three or more layers of screen cloth, screen mesh, and/or other screening material are connected to a frame and/or to a support, e.g., by adhering with an adhesive, by bonding with epoxy material, by gluing with glue (e.g., but not limited to hot melt glue), or by bonding with plastic.

In many cases when a screen fails or exceeds its useful life, it is simply discarded. Typically none of the component parts is re-used in another screen or screen assembly.

There has long been a need, recognized by the present inventors, to recover and re-use parts of a vibratory separator screen or screen assembly which can be recovered; and to salvage those parts that are salvageable. There has long been a need, recognized by the present inventors, for making a screen or screen assembly for a vibratory separator that uses parts recovered from a screen or screen assembly, e.g. from a used screen assembly or from one that has been rejected during a manufacturing process.

SUMMARY OF THE PRESENT INVENTION

The present invention discloses, in at least certain aspects, screen assemblies made with parts recovered from another screen assembly, e.g., a screen frame and/or a screen support. In one method according to the present invention, a first used or rejected screen is heated to powderize, degrade, turn to ash, break down and/or cook off ("degrade, etc.") adhesive, plastic, epoxy, bonding material, and or glue (e.g., but not limited to, hot melt glue) material which secures parts of a screen together and/or which secures layers of mesh or screening material on a screen together. Required heat can be provided in an oven or with heating apparatus (e.g. a blow torch), although these ovens and apparatuses are not equivalents. Such heating may also degrade, etc., paint and/or coatings on a screen assembly.

In certain embodiments, the present invention discloses, in at least certain aspects, methods for recovering parts of a screen assembly which result in: the degrading etc. of bonding material, adhesive, epoxy, plastic, or glue; in the loosening or freeing of screening material from a frame or support to which it had been secured so that the frame, support and/or the screening material can be salvaged; and/or in the degrading, etc., and/or removal of paint and/or coatings from parts of the screen assembly. If the screening material cannot be salvaged for re-use on another screen or screen assembly, it can be salvaged for re-use in other forms; for example, often stainless steel screening material is used on screen assemblies for shale shakers. A significant part of the screening material from a screen assembly can be recovered—using methods according to the present invention—and the stainless steel can then be used in applications other than on screen assemblies, e.g. in basic processes to make items out of stainless steel. If frames and/or supports recovered using methods according to the present invention cannot be recovered in sufficiently good shape for re-use in new screen assemblies or in other apparatuses or equipment, the metal in them can be salvaged for use in other applications or in basic manufacturing processes. In certain aspects this may be true when the frame or support of the screen or screen assembly is made from metals such as steel, carbon steel, stainless steel, aluminum, aluminum alloys, brass, bronze, zinc, and zinc alloys.

The present invention discloses, in at least certain aspects, a screen assembly for a vibratory separator or shale shake that has supporting apparatus with a plurality of openings therethrough, screening material on the supporting apparatus over the plurality of openings, the supporting apparatus recovered from a predecessor screen assembly by applying heat to the predecessor screen assembly, the predecessor screen assembly having the supporting apparatus and predecessor screening material secured to the supporting apparatus by securing material, the heat applied to the predecessor screen assembly sufficient to degrade, etc. the securing material so that separation of the supporting apparatus from the screening material and recovery of the supporting apparatus is facilitated.

The present invention discloses, in certain embodiments, a method for recovering parts of a screen assembly for a vibratory separator, the method including applying heat to a screen assembly, the screen assembly having supporting apparatus and screening material secured to the supporting apparatus by securing material, the supporting apparatus having a plurality of openings therethrough, and heating the securing material sufficiently to degrade, etc. the securing material to facilitate separation of the supporting apparatus from the securing material and recovery of the supporting apparatus. The present invention discloses, in certain aspects, a method for making a screen assembly for a vibratory separator, the method including recovering supporting apparatus from a predecessor screen assembly, the predecessor screen assembly with predecessor screening material on the supporting apparatus, the recovering done by a recovery method for recovering parts of the predecessor screen assembly, the recovery method including applying heat to the predecessor screen assembly, the screen assembly having the supporting apparatus and predecessor screening material secured to the supporting apparatus by securing material, the supporting apparatus having a plurality of openings therethrough, heating the securing material sufficiently to degrade, etc. the securing material to facilitate separation of the supporting apparatus from the securing material and recovery of the supporting apparatus, and connecting new screening material to the supporting apparatus.

It is, therefore, an object of at least certain preferred embodiments of the present invention to provide:

New, useful, unique, efficient, non-obvious screen assemblies for vibratory separators and shale shakers parts or components of which are recovered from other screens or screen assemblies;

New, useful, unique, efficient, non-obvious methods for recovering such parts, including, but not limited to, frames and supports and screening material;

Such methods which facilitate the recovery for salvage of parts of such screen assemblies;

Such methods which include a step or steps of degrading, breaking down, turning to ash or powder, or cooking-off of adhesive, epoxy, glue, plastic, or bonding material;

Such methods and screen assemblies which provide a significant reduction in the cost of manufacture of screen assemblies for vibratory separators by re-using screen assembly parts; and New, useful, unique, efficient, non-obvious methods for making screen assemblies from parts recovered by methods according to the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS PREFERRED AT THE TIME OF FILING FOR THIS PATENT

Figures 1, 1A:
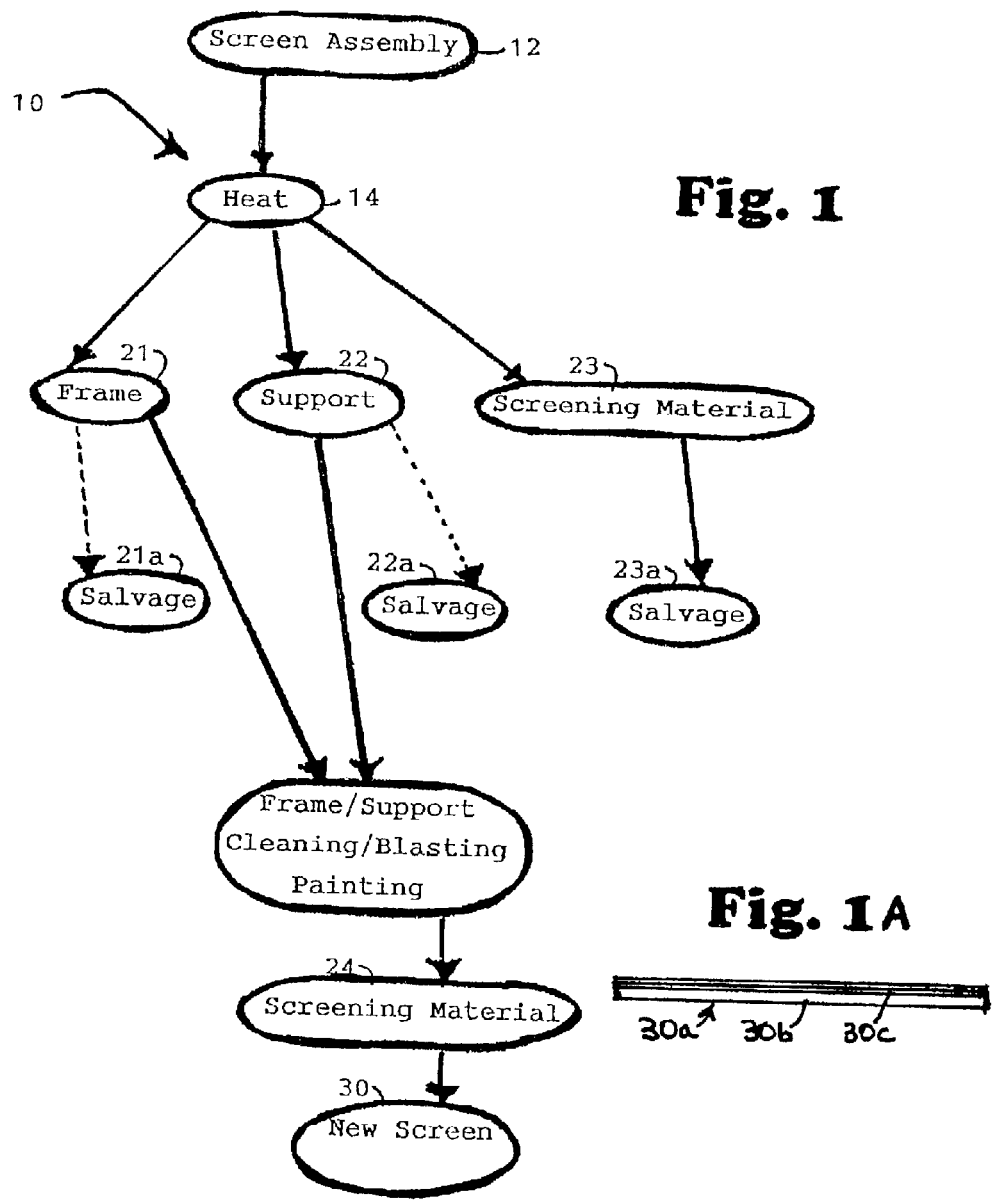
FIG. 1 is a schematic that illustrates steps in a method according to the present invention.
FIG. 1A is a side view of a screen assembly according to the present invention.

FIG. 1 shows a method 10 according to the present invention in which a screen assembly 12 which has frame 21, a support 22 on the frame, and screening material 23 connected to and on the support is subjected to heat 14, e.g., in an oven, to degrade and/or cook off material that secures together parts of the screen assembly 12 (and, optionally, to degrade, etc. paint and/or coating on the screen assembly). Sufficient heat is applied for a sufficient period of time to loosen or free the frame 21, support 22, and screening material 23 from each other or to facilitate such loosening or freeing. Any of these parts may, according to the present invention, be salvaged as salvage 21a, 22a, and 22b, respectively. Alternatively, any of these parts may be recovered for re-use.

As shown in FIG. 1, the recovered frame 21 and/or the recovered support 22 are cleaned, water blasted, and/or sand blasted; optionally primed, painted, heated, and/or otherwise prepared for re-use; and then combined with new screening material 24 to form a new screen assembly 30 (which may be any known screen assembly that employs one or more of the recovered parts).

It is within the scope of this invention for the screen material 23 to be one, two, three or more layers and to be of any mesh size or opening size, including, but not limited to any known fine, medium and/or coarse mesh or screening material used on any known screen or screen assembly for vibratory separators or shale shakers. It is within the scope of this invention for the screen material to be secured to the frame and/or support and/or for multiple layers of such material to be connected together by any know method and/or material, including, but not limited to, by epoxy, glue, plastic, adhesive, and/or sewing material used on any known screen or screen assembly for vibratory separators or shale shakers. It is within the scope of this invention for the frame 21 to be any known frame for any known screen or screen assembly for vibratory separators or shale shakers. It is within the scope of this invention for the support 22 to be any known support for any known screen or screen assembly for vibratory separators or shale shakers, including, but not limited to, tubular frame, coarse wire mesh, perforated plate supports and strip supports.

FIG. 1A shows one embodiment 30a of a screen assembly 30 which has a lower support apparatus 30b and a plurality of three layers 30c of screening material secured to the supporting apparatus 30b, e.g. with epoxy, glue, plastic, or adhesive.

Figure 2:
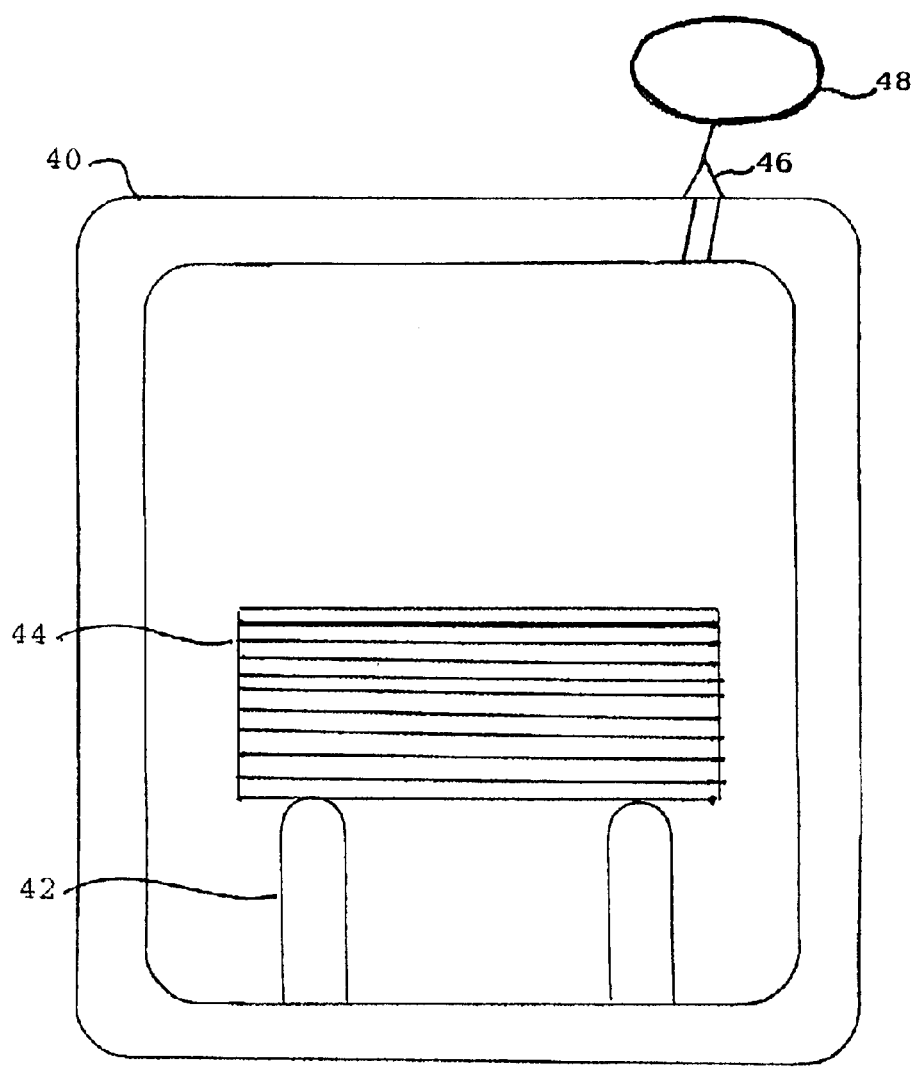
FIG. 2 is a schematic view of screen assemblies in an oven for heating by a method according to the present invention.

FIG. 2 shows an oven 40 with supports 42 on which are placed a plurality of screen assemblies 44 (which may be any screen assembly described herein). The screen assemblies 44 are subjected to sufficient heat in the oven for a sufficient time period to cook off material used to hold parts of the screen assemblies together. In one particular aspect of the present invention, the screen assemblies 44 have parts that are secured together by epoxy material [e.g., as disclosed in U.S. Pat. Nos. 6,290,068; 6,209,726; 6,202,856; 5,927,511; 5,944,993; 6,220,448 (all fully incorporated herein for all purposes) and in the references cited therein] and they are, in one aspect, subjected to heat of at least 700 degrees F. for at least 4 hours—although it is within the scope of this invention to employ a temperature and time period sufficient to effect the degrading, etc. of the epoxy e.g., but not limited to, at 800 degrees F. for 5 or more hours. In one aspect, the temperature is about 850 degrees F.; the time period is 7 to 8 hours; the frames (tubular steel frames) and supports (if present, e.g. perforated metal plates or strip supports) are recovered for re-use; and the screening material (one or multiple layers of stainless steel material) is salvaged (not for re-use in new screen assemblies). In one aspect, the oven 40 is vented through vent apparatus 46 and cooked-off material vented from the oven 40 is, optionally, fed to an incinerator 48 in which it is incinerated.

Temperatures and times to effect degrading, etc. according to the present invention, of known epoxies, adhesives, glues and bonding materials are well known in the art. According to the present invention either such material can be substantially cooked off from a screen assembly during heating, or it can be degraded, powderized, or turned to ash to a sufficient degree so that complete removal of the material by, e.g., grinding, water blasting or sand blasting is facilitated. In one aspect, e.g. with epoxies, it is not necessary, according to the present invention, that all adhesive bonds between the epoxy and the screen parts be broken in order to facilitate separation of screen assembly parts and it is not, according to the present invention, necessary to completely oxidize all of the epoxy. Any time period of heating at a temperature sufficient to result in a loss of adhesive integrity which will facilitate the separation and recovery of parts may be employed according to the present invention.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen assembly for a vibratory separator comprising
   supporting apparatus with a plurality of openings therethrough, the supporting apparatus made of metal,
   screening material on the supporting apparatus over the plurality of openings,
   the supporting apparatus recovered from a predecessor screen assembly by applying heat to the predecessor screen assembly, the predecessor screen assembly having the supporting apparatus and predecessor screening material secured to the supporting apparatus by securing material, the heat applied to the predecessor screen assembly sufficient to degrade the securing material so that separation of the supporting apparatus from the screening material and recovery of the supporting apparatus is facilitated.

2. The screen assembly of claim 1 wherein the securing material is epoxy and the heat is applied at a temperature of at least 700 degrees F. for at least 4 hours.

3. The screen assembly of claim 1 wherein the securing material is plastic.

4. The screen assembly of claim 1 wherein the securing material is hot melt glue.

5. The screen assembly of claim 1 wherein the support apparatus is from the group consisting of tubular frame, perforated plate, coarse wire mesh, and strip support.

6. The screen assembly of claim 1 wherein the screening material comprises a plurality of layers of screening material.

7. The screen assembly of claim 6 wherein the plurality of layers of screening material are connected together by connection means.

8. The screen assembly of claim 7 wherein the connection means is from the group consisting of epoxy, glue and adhesive.

9. The screen assembly of claim 1 wherein the screening material is connected to the supporting apparatus by material from the group consisting of epoxy, glue, and plastic.

10. The screen assembly of claim 1 wherein the supporting apparatus is cleaned prior to use.

11. The screen assembly of claim 1 wherein the screening material is stainless steel.

12. A screen assembly for a vibratory separator comprising
    supporting apparatus with a plurality of openings therethrough, the supporting apparatus made of metal,
    screening material on the supporting apparatus over the plurality of openings,
    the supporting apparatus recovered from a predecessor screen assembly by applying heat to the predecessor screen assembly, the predecessor screen assembly having the supporting apparatus and predecessor screening material secured to the supporting apparatus by securing material, the heat applied to the predecessor screen assembly sufficient to degrade the securing material so that separation of the supporting apparatus from the screening material and recovery of the supporting apparatus is facilitated,
    the supporting apparatus from the group consisting of tubular frame, perforated plate, coarse wire mesh, and strip support,
    the screening material comprising a plurality of layers of screening material,
    the plurality of layers of screening material connected together by connection means,
    the connection means from the group consisting of epoxy, glue, and plastic, and
    the screening material connected to the supporting apparatus by material from the group consisting of epoxy, glue, and plastic.

13. A method for recovering parts of a screen assembly for a vibratory separator, the method comprising
    applying heat to a screen assembly, the screen assembly having supporting apparatus and screening materiar secured to the supporting apparatus by securing material, the supporting apparatus made of metal and having a plurality of openings therethrough, and
    heating the securing material sufficiently to degrade the securing material to facilitate separation of the supporting apparatus from the securing material and recovery of the supporting apparatus.

14. The method of claim 13 wherein the metal is steel, the screening material is stainless steel bonded together and bonded to the supporting apparatus by epoxy, the method further comprising
    heating the epoxy for at least 4 hours at least 700 degrees F.

15. The method of claim 13 wherein the securing material is hot melt glue.

16. The method of claim 13 wherein the supporting apparatus is from the group consisting of tubular frame, perforated plate, coarse wire mesh, and strip support.

17. The method of claim 13 wherein the screening material comprises a plurality of layers of screening material, wherein the plurality of layers of screening material are connected together by connection means, and wherein the connection means is from the group consisting of epoxy, glue and plastic.

18. A method for making a screen assembly for a vibratory separator, the method comprising
    recovering supporting apparatus from a predecessor screen assembly, the predecessor screen assembly comprising predecessor screening material on the supporting apparatus, the supporting apparatus made of metal, said recovering done by a recovery method for recovering parts of the predecessor screen assembly, said recovery method comprising applying heat to the predecessor screen assembly, the screen assembly having the supporting apparatus and predecessor screening material secured to the supporting apparatus by securing material, the supporting apparatus having a plurality of openings therethrough, heating the securing material sufficiently to degrade the securing material to facilitate separation of the supporting apparatus from the securing material and recovery of the supporting apparatus, and connecting new screening material to the supporting apparatus.

19. The method of claim 18 further comprising cleaning the supporting apparatus to remove securing material therefrom prior to connecting the screening material thereto.

20. The method of claim 18 wherein the screening material is connected to the supporting apparatus with securing material from the group consisting of epoxy, glue, and plastic.

* * * * *